(12) United States Patent
Sakai et al.

(10) Patent No.: US 8,405,674 B2
(45) Date of Patent: Mar. 26, 2013

(54) COLOR CALIBRATION SYSTEM

(75) Inventors: Hidenori Sakai, Tokyo (JP); Yasuhiro Arakawa, Tokyo (JP); Hiroshi Ueno, Tokyo (JP); Hideki Tanizoe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 583 days.

(21) Appl. No.: 12/650,294

(22) Filed: Dec. 30, 2009

(65) Prior Publication Data
US 2010/0188418 A1  Jul. 29, 2010

(30) Foreign Application Priority Data

Jan. 23, 2009 (JP) ................................. 2009-012733

(51) Int. Cl.
*G09G 5/02* (2006.01)
(52) U.S. Cl. ......... 345/593; 345/589; 345/594; 345/595
(58) Field of Classification Search ........................ None
See application file for complete search history.

(56) References Cited

U.S. PATENT DOCUMENTS

2002/0163527 A1* 11/2002 Park ................................ 345/594
2004/0049662 A1* 3/2004 Janke ............................ 712/220
2004/0160633 A1* 8/2004 Yoshikawa ................... 358/1.15
2008/0030918 A1 2/2008 Nakajima
2010/0045211 A1 2/2010 Kitamura et al.

FOREIGN PATENT DOCUMENTS

| JP | 2004-070228 A | 3/2004 |
| JP | 2006-349835 A | 12/2006 |
| JP | 2008-009090 A | 1/2008 |
| TW | 200739122 | 10/2007 |
| WO | WO 2008/056665 A1 | 5/2008 |

OTHER PUBLICATIONS

Pantone huey User Guide, "User Guide for huey software & huey PRO software", 2007.*

* cited by examiner

*Primary Examiner* — Tize Ma
*Assistant Examiner* — Yingchun He
(74) *Attorney, Agent, or Firm* — Birch, Stewart, Kolasch & Birch, LLP.

(57) ABSTRACT

A color calibration system in accordance with a preferred embodiment of the present invention comprises a display device provided with a color sensor for detecting a color temperature and illuminance of ambient light, a microcomputer, and a colorimeter for performing colorimetry on a display screen of the display device from the outside. The microcomputer calculates a target value by using a preset calculation equation and a detection result on the ambient light detected by the color sensor. Then, the microcomputer automatically performs color calibration of the display device so that a colorimetry result obtained by the colorimeter may agree with the target value.

22 Claims, 9 Drawing Sheets

F I G . 2

| COLOR TEMPERATURE SAMPLE | MEASUREMENT RESULT OF RGB COLOR SENSOR | MEASUREMENT RESULT OF REFERENCE COLORIMETER |
|---|---|---|
| SAMPLE 1 | R1,G1,B1 | X1,Y1,Z1 |
| SAMPLE 2 | R2,G2,B2 | X2,Y2,Z2 |
| SAMPLE 3 | R3,G3,B3 | X3,Y3,Z3 |

FIG. 4

| TYPE OF LIGHTING | TYPE OF COLOR TEMPERATURE | TYPE OF ILLUMINANCE | TARGET VALUE |
|---|---|---|---|
| FLUORESCENT LAMP | WARM WHITE | DARK | T1 |
| FLUORESCENT LAMP | NEUTRAL WHITE | DARK | T2 |
| FLUORESCENT LAMP | DAYLIGHT COLOR | DARK | T3 |
| FLUORESCENT LAMP | COOL WHITE | DARK | T4 |
| FLUORESCENT LAMP | WARM WHITE | NORMAL | T5 |
| FLUORESCENT LAMP | NEUTRAL WHITE | NORMAL | T6 |
| FLUORESCENT LAMP | DAYLIGHT COLOR | NORMAL | T7 |
| FLUORESCENT LAMP | COOL WHITE | NORMAL | T8 |
| FLUORESCENT LAMP | WARM WHITE | BRIGHT | T9 |
| FLUORESCENT LAMP | NEUTRAL WHITE | BRIGHT | T10 |
| FLUORESCENT LAMP | DAYLIGHT COLOR | BRIGHT | T11 |
| FLUORESCENT LAMP | COOL WHITE | BRIGHT | T12 |
| FLUORESCENT LAMP | WARM WHITE | CONSIDERABLY BRIGHT | T13 |
| FLUORESCENT LAMP | NEUTRAL WHITE | CONSIDERABLY BRIGHT | T14 |
| FLUORESCENT LAMP | DAYLIGHT COLOR | CONSIDERABLY BRIGHT | T15 |
| FLUORESCENT LAMP | COOL WHITE | CONSIDERABLY BRIGHT | T16 |
| INCANDESCENT LAMP | | DARK | T17 |
| INCANDESCENT LAMP | | NORMAL | T18 |
| INCANDESCENT LAMP | | BRIGHT | T19 |
| INCANDESCENT LAMP | | CONSIDERABLY BRIGHT | T20 |
| ELECTRIC BULB | | DARK | T21 |
| ELECTRIC BULB | | NORMAL | T22 |
| ELECTRIC BULB | | BRIGHT | T23 |
| ELECTRIC BULB | | CONSIDERABLY BRIGHT | T24 |
| LED | | DARK | T25 |
| LED | | NORMAL | T26 |
| LED | | BRIGHT | T27 |
| LED | | CONSIDERABLY BRIGHT | T28 |
| SUNLIGHT | | DARK | T29 |
| SUNLIGHT | | NORMAL | T30 |
| SUNLIGHT | | BRIGHT | T31 |
| SUNLIGHT | | CONSIDERABLY BRIGHT | T32 |

F I G. 5
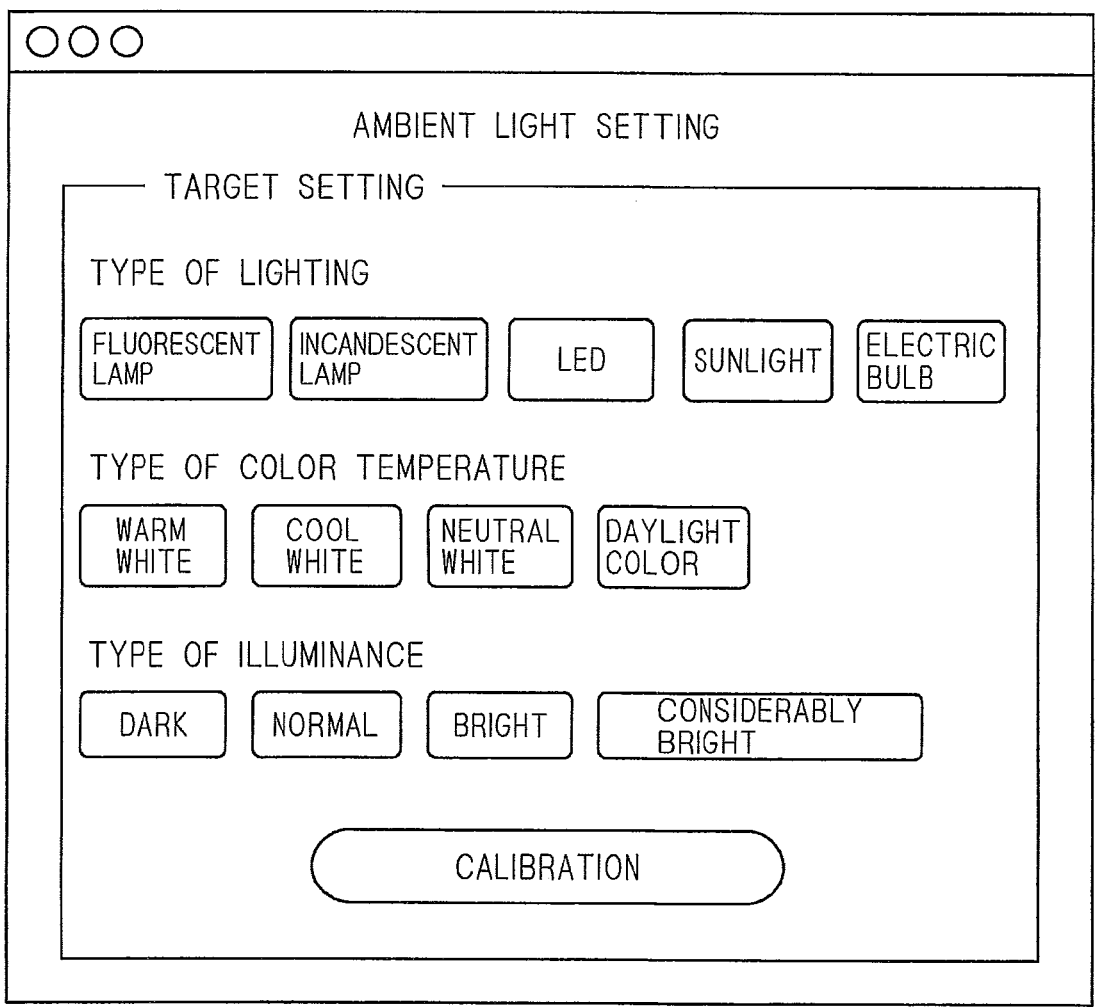

F I G. 8

| COLOR TEMPERATURE SAMPLE | MEASUREMENT RESULT OF RGB COLOR SENSOR | MEASUREMENT RESULT OF REFERENCE COLORIMETER |
|---|---|---|
| SAMPLE 1 | R1',G1',B1' | X1',Y1',Z1' |
| SAMPLE 2 | R2',G2',B2' | X2',Y2',Z2' |
| SAMPLE 3 | R3',G3',B3' | X3',Y3',Z3' |

COLOR CALIBRATION SYSTEM

BACKGROUND OF THE INVENTION

1. Field of the Invention

The present invention relates to a color calibration system for a display device.

2. Description of the Background Art

In order for color matching in a visual environment, conventionally, color calibration for a display device has been performed by using a colorimeter. In a background-art color calibration system, a user performs an adjustment operation using a preset white point (luminance, chromaticity) or a user-desired white point as a target value. In the color calibration system, it is necessary for the user to adjust in advance various conditions which cannot be managed by a display itself, such as a color temperature and illuminance of lighting and color of paper in the visual environment.

Illumination light and a display of the display device are different from each other in shape of spectral distribution of observed light. Therefore, even if use of a dedicated colorimeter causes respective colorimetry values in tristimulus values of the CIE XYZ color space and the like to agree with each other between the illumination light and the display of the display device, actual visuals do not necessarily coincide.

For this reason, the user repeats calibration several times with a target value set by using limited information and tools, to make color matching in the visual environment. In the above-discussed color calibration system, since an optimal adjustment target value in accordance with the environment is uncertain, it is difficult to make accurate color matching. In other words, in the above-discussed color calibration system, it is extremely complicated and difficult to make color matching. A solution for this problem is shown in, for example, Patent Document 1 (Japanese Patent Application Laid Open No. 2006-349835).

In the technique of Patent Document 1, colorimetry of a reference object having reference white, which is irradiated with ambient light, is performed by using a colorimeter. A colorimetry result obtained by the colorimeter is a target value for color calibration.

In the technique of Patent Document 1, depending on white reference objects, in some cases, there is a difference in reflectance and spectral distribution, and generally, the spectral distribution of the white reference object is greatly different in shape from that of a monitor. For this reason, even if color matching is performed by using a colorimetry result obtained by a dedicated colorimeter, accurate color matching can not be necessarily achieved.

Further, in order to continue stable color calibration, it is necessary to always control the reference object. Colorimeters capable of performing colorimetry on an object color are limited, and a cheap contact-type colorimeter cannot perform accurate colorimetry in some cases.

In other words, the technique of Patent Document 1 has a problem of precision of color calibration and that of difficulty in achieving the color calibration.

For stable calibration, it is important that the display state of luminance, tint, and the like of the display device of which the power supply is repeatedly turned on and off irregularly should be stable during the calibration. It is very difficult, however, for the user who is an operator of the color calibration to grasp a stable state of the display device.

SUMMARY OF THE INVENTION

It is an object of the present invention to provide a color calibration system capable of performing color calibration precisely and simply.

The present invention is intended for a color calibration system. According to a first aspect of the present invention, the color calibration system includes a display device, a microcomputer, and a colorimeter. The display device is provided with a color sensor for detecting a color temperature and illuminance of ambient light. The colorimeter performs colorimetry on a display screen of the display device from the outside. The microcomputer calculates a target value by using a preset calculation equation and a detection result on the ambient light detected by the color sensor. The microcomputer further automatically performs color calibration of the display device so that a colorimetry result obtained by the colorimeter agrees with the target value.

By the first aspect of the present invention, the color calibration of the display device can be automatically performed in such a manner that the colorimetry result obtained by the colorimeter agrees with the target value. It is therefore possible to perform the color calibration precisely and simply.

According to a second aspect of the present invention, the color calibration system includes a display device, a microcomputer, and a colorimeter. The colorimeter performs colorimetry on a display screen of said display device from the outside. The microcomputer includes a storage unit for storing target values corresponding to a combination of the type of lighting and the type of illuminance therein. The microcomputer displays the type of lighting and the type of illuminance as a selection menu in a selectable manner on a predetermined display unit. The microcomputer reads a predetermined target value out from the storage unit in accordance with a combination of the type of lighting and the type of illuminance which is selected from the selection menu. The microcomputer further automatically performs color calibration so that the predetermined target value which is read out agrees with a colorimetry result obtained by the colorimeter.

By the second aspect of the present invention, the color calibration can be automatically performed in such a manner that the predetermined target value agrees with the colorimetry result obtained by the colorimeter. It is therefore possible to perform the color calibration precisely and simply.

According to a third aspect of the present invention, the color calibration system includes a display device, a microcomputer, and a prism or a reflecting mirror. The display device is provided with a color sensor for detecting a color temperature and illuminance. The prism or the reflecting mirror is attachable to and detachable from the display device. The microcomputer calculates a target value by using a detection result on ambient light detected by the color sensor in a state where the prism or the reflecting mirror is not attached and a first calculation equation which is preset. The color sensor performs colorimetry on a display screen of the display device, which is inputted through the prism or the reflecting mirror in a state where the prism or the reflecting mirror is attached. The microcomputer automatically performs color calibration by using the result of the colorimetry obtained by the color sensor and the target value.

By the third aspect of the present invention, the color calibration can be automatically performed by using the result of colorimetry obtained by the color sensor and the target value. It is therefore possible to perform the color calibration precisely and simply.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a view showing a method of calculating a matrix correction factor and a first matrix correction factor;

FIGS. 4 and 5 are views each showing an operation of the color calibration system in accordance with the second preferred embodiment;

FIG. 8 is a view showing a method of calculating a second matrix correction factor.

DESCRIPTION OF THE PREFERRED EMBODIMENTS

Hereinafter, the present invention will be discussed specifically, with reference to figures showing the preferred embodiments.

<The First Preferred Embodiment>

Figure 1:
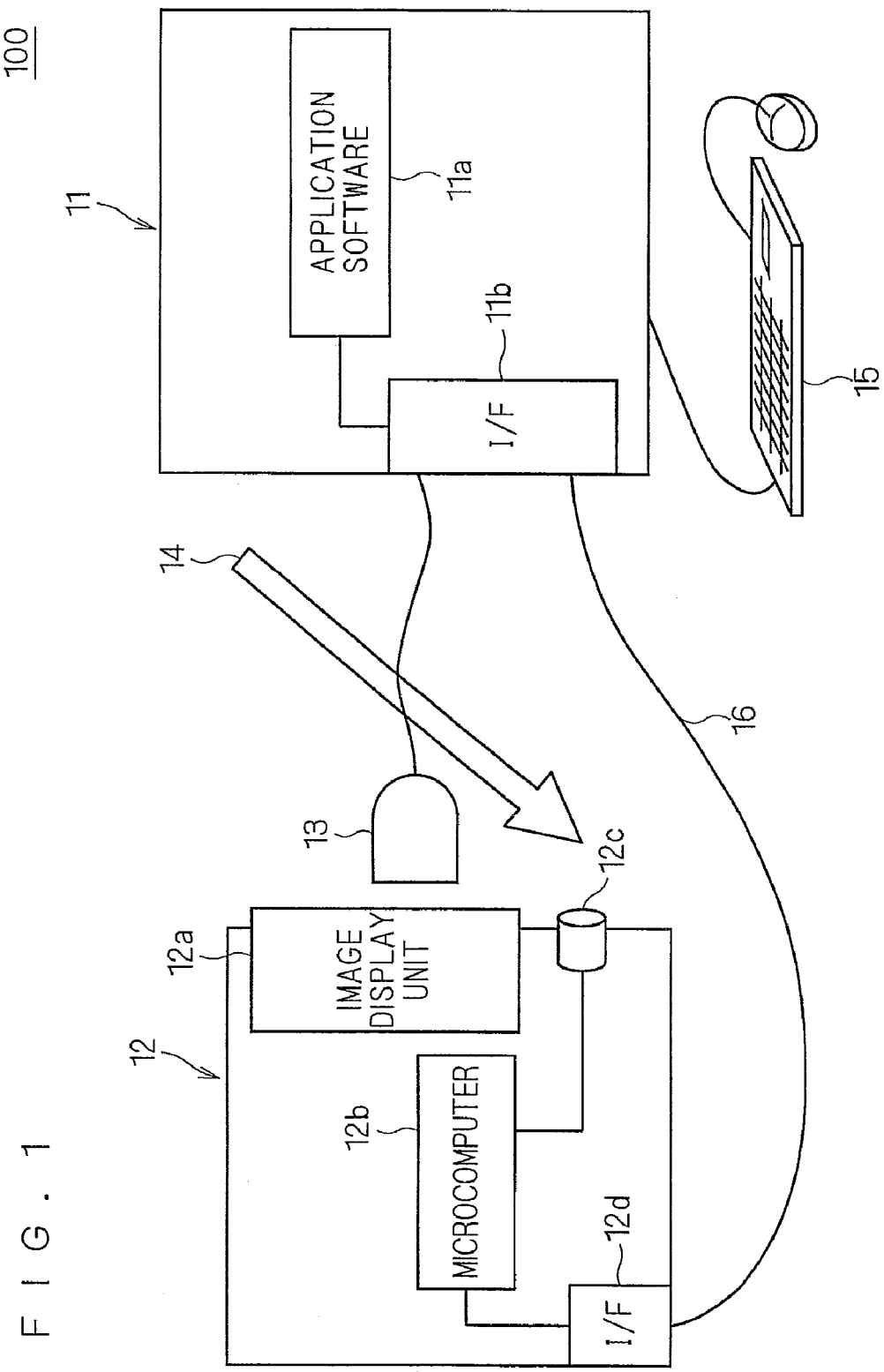
FIG. 1 is a view showing a configuration of a color calibration system in accordance with a first preferred embodiment.

FIG. 1 shows a configuration of a color calibration system 100 for a display device for the purpose of color matching in accordance with the first preferred embodiment.

As shown in FIG. 1, the color calibration system 100 comprises a computer 11, a display device 12, a colorimeter 13, and a communication means 16. In the first preferred embodiment, a measurement result obtained by an RGB color sensor 12c is referred to as a "detection result". On the other hand, a measurement result obtained by the colorimeter 13 is referred to as a "colorimetry result".

Application software 11a for performing color calibration and making a color profile is installed in the computer 11. The computer 11 comprises a communication interface 11b.

The communication interface 11b is connected to the colorimeter 13 in order to receive a colorimetry result obtained by the colorimeter 13. The communication interface 11b is further connected to a communication interface 12d on the side of the display device 12 in such a manner as to establish two-way communication.

To the computer 11, a keyboard 15 (including a mouse) is connected for operating the computer 11.

The display device 12 comprises an image display unit 12a, a microcomputer 12b, the RGB color sensor (RGB color filter sensor) 12c, and the interface 12d. The display device 12 can perform a white point adjustment through adjustment of emission balance of RGB primary colors to be subjected to color management.

On the image display unit 12a, displayed is a display image (including white, color patch, and the like). The image display unit 12a can also serve as a display unit of the computer 11 during the color calibration.

In accordance with the application software 11a, the microcomputer 12b calculates a target value by using a preset calculation equation and a detection result obtained by the RGB color sensor 12c. The microcomputer 12b further automatically performs color calibration, in accordance with the application software 11a, so that the colorimetry result obtained by the colorimeter 13 and transferred via the computer 11 may agree with the above target value.

Under the control of the microcomputer 12b which operates in accordance with the application software 11a, the RGB color sensor 12c performs a measurement. The RGB color sensor 12c can detect a color temperature and illuminance of indeterminate ambient light including lighting. The RGB color sensor 12c outputs the measurement result obtained by itself as an RGB value. The RGB color sensor 12c is disposed near the image display unit 12a in the display device 12.

The communication interface 12d is connected to the communication interface 11b on the side of the computer 11 through the communication means 16 in such a manner as to establish two-way communication.

The colorimeter 13 is disposed to face the image display unit 12a during the color calibration. The colorimeter 13 can perform colorimetry on the image displayed on the image display unit 12a from the outside.

Next, discussion will be made on an operation of the color calibration system 100 in accordance with the first preferred embodiment.

First, in accordance with the application software 11a installed in the computer 11, the microcomputer 12b controls the RGB color sensor 12c. Under the control, the RGB color sensor 12c provided in the display device 12 detects the color temperature and the illuminance of the ambient light 14 including lighting. The RGB color sensor 12c outputs the detection result as an RGB value signal and transfers the detection result (RGB value) to the microcomputer 12b.

Next, in accordance with the installed application software, the microcomputer 12b calculates the target value by using a present calculation equation (Eq. 1) and the received detection result (the detection result transferred from the RGB color sensor 12c). The equation Eq. 1 is expressed as:

$$\begin{pmatrix} X \\ Y \\ Z \end{pmatrix} = \begin{pmatrix} K_{xr} & K_{xg} & K_{xb} \\ K_{yr} & K_{yg} & K_{yb} \\ K_{zr} & K_{zg} & K_{zb} \end{pmatrix} \times \begin{pmatrix} R \\ G \\ B \end{pmatrix} \quad \text{(Eq. 1)}$$

Herein, the left side of Eq. 1 represents the above target value calculated by the microcomputer 12b. The target value is calculated as an XYZ tristimulus value matrix. The first term of the right side of Eq. 1 represents a matrix correction factor matrix. The second term of the right side of Eq. 1 represents an RGB value matrix which is the above detection result transferred from the RGB color sensor 12c.

The matrix correction factor matrix is set in the microcomputer 12b in advance. The matrix correction factor matrix is calculated by using a measurement result obtained by the RGB color sensor 12c on a predetermined color temperature sample and an XYZ measurement result obtained by a reference colorimeter (not shown) on the predetermined color temperature sample before performing the color calibration. The reference colorimeter can measure tristimulus values XYZ. A method of calculating the matrix correction factor matrix will be specifically discussed below.

First, as the color temperature samples (fluorescent lamp samples having different color temperatures), prepared are samples 1, 2, and 3. The samples 1, 2, and 3 are measured by the RGB color sensor 12c. On the other hand, the samples 1, 2, and 3 are measured by the reference colorimeter. The measurement result (RGB values) obtained by the RGB color sensor 12c and the measurement result (XYZ tristimulus values) obtained by the reference colorimeter are shown in FIG. 2.

In the exemplary case of FIG. 2, the measurement result obtained by the RGB color sensor 12c on the sample 1 indicates "R1, G1, B1". The measurement result obtained by the RGB color sensor 12c on the sample 2 indicates "R2, G2, B2". The measurement result obtained by the RGB color sensor 12c on the sample 3 indicates "R3, G3, B3". On the other hand, the measurement result obtained by the reference colorimeter on the sample 1 indicates "X1, Y1, Z1". The measurement result obtained by the reference colorimeter on the sample 2 indicates "X2, Y2, Z2". The measurement result obtained by the reference colorimeter on the sample 3 indicates "X3, Y3, Z3".

Next, matrix elements of the matrix correction factor matrix are obtained by using Eqs. 2, 3, and 4 shown below and the measurement results shown in FIG. 2.

$$\begin{pmatrix} K_{xr} \\ K_{xg} \\ K_{xb} \end{pmatrix} = \begin{pmatrix} R1 & G1 & B1 \\ R2 & G2 & B2 \\ R3 & G3 & B3 \end{pmatrix}^{-1} \times \begin{pmatrix} X1 \\ X2 \\ X3 \end{pmatrix} \quad \text{(Eq. 2)}$$

$$\begin{pmatrix} K_{yr} \\ K_{yg} \\ K_{yb} \end{pmatrix} = \begin{pmatrix} R1 & G1 & B1 \\ R2 & G2 & B2 \\ R3 & G3 & B3 \end{pmatrix}^{-1} \times \begin{pmatrix} Y1 \\ Y2 \\ Y3 \end{pmatrix} \quad \text{(Eq. 3)}$$

$$\begin{pmatrix} K_{zr} \\ K_{zg} \\ K_{zb} \end{pmatrix} = \begin{pmatrix} R1 & G1 & B1 \\ R2 & G2 & B2 \\ R3 & G3 & B3 \end{pmatrix}^{-1} \times \begin{pmatrix} Z1 \\ Z2 \\ Z3 \end{pmatrix} \quad \text{(Eq. 4)}$$

The calculated matrix correction factor matrix is set in the microcomputer 12b before performing the color calibration.

Returning to discussion on the operation of the first preferred embodiment, the microcomputer 12b calculates the target value from Eq. 1 by using the preset matrix correction factor and the above detection result transferred from the RGB color sensor 12c.

The calculated target value is transferred from the microcomputer 12b through the communication interface 12d to the communication interface 11b. The target value received by the communication interface 11b is set to the application software installed in the computer 11.

On the other hand, the colorimeter 13 performs colorimetry on the image displayed on the image display unit 12a as occasion arises. The colorimetry result is transferred through the communication interface 11b, the communication means 16, and the communication interface 12d to the microcomputer 12b on the side of the display device 12 as occasion arises.

In accordance with the application software 11a installed in the computer 11, the microcomputer 12b automatically performs the color calibration so that the received colorimetry result obtained by the colorimeter 13 may agree with the calculated target value.

Since the color calibration system of the first preferred embodiment has the above configuration, the system does not need any special measurement device. Further, by using the RGB color sensor 12c to detect the indeterminate ambient light 14, it is possible for a user having no expert knowledge to easily determine the type of ambient light 14 and the color temperature thereof. The target value is calculated from the detection result and an automatic adjustment of the white point and luminance is performed so that the target value may agree with the colorimetry result obtained by the colorimeter 13. It is therefore possible to perform the color calibration precisely and simply.

In the above discussion, the microcomputer 12b performs calculation of the target value, the color calibration, and so on. There may be a case, however, where the calculation of the target value is performed on the side of the computer 11 and the microcomputer 12b performs the color calibration.

Though the XYZ tristimulus value is obtained as the target value in the above discussion, a CIE chromaticity xy value may be adopted as the target value.

<The Second Preferred Embodiment>

Figure 3:
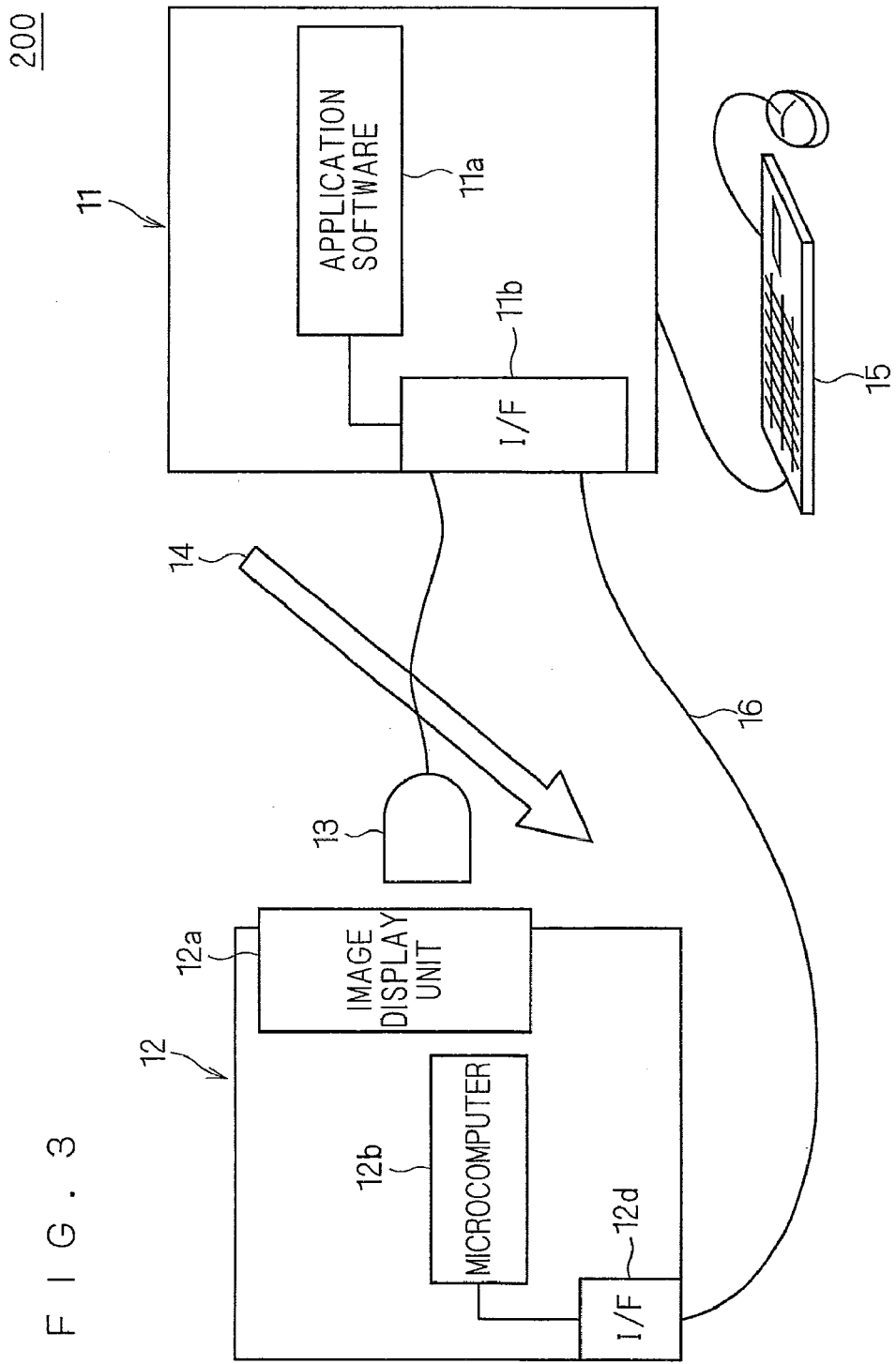
FIG. 3 is a view showing a configuration of a color calibration system in accordance with a second preferred embodiment.

FIG. 3 shows a configuration of a color calibration system 200 for a display device for the purpose of color matching in accordance with the second preferred embodiment.

As shown in FIG. 3, the color calibration system 200 comprises the computer 11, the display device 12, the colorimeter 13, and the communication means 16.

Application software 11a for performing color calibration and making a color profile is installed in the computer 11. The computer 11 comprises the communication interface 11b.

The communication interface 11b is connected to the colorimeter 13 in order to receive a colorimetry result obtained by the colorimeter 13. The communication interface 11b is further connected to the communication interface 12d on the side of the display device 12 in such a manner as to establish two-way communication.

To the computer 11, the keyboard 15 (including the mouse) is connected for operating the computer 11.

The display device 12 comprises the image display unit 12a, the microcomputer 12b, and the interface 12d. The display device 12 can perform a white point adjustment through adjustment of emission balance of RGB primary colors to be subjected to color management.

On the image display unit 12a, displayed is a display image (including white, color patch, and the like). The image display unit 12a can also serve as the display unit of the computer 11 during the color calibration.

In accordance with the application software 11a installed in the computer 11, the microcomputer 12b operates. The microcomputer 12b stores target values corresponding to a combination of the type of lighting, the type of color temperature, and the type of illuminance as, e.g., a table therein.

Though, in the second preferred embodiment, discussion will be made on the configuration in which the table is stored and set in the microcomputer 12b, a memory in which the table is stored and set may be additionally provided in the display device 12. In the configuration including the memory, the microcomputer 12b makes reference to the table in the memory and performs an operation of reading necessary data out therefrom and so on.

As the type of lighting, for example, a fluorescent lamp, an incandescent lamp, an LED, an electric bulb, sunlight, or the like may be adopted. If the type of lighting is a fluorescent lamp, as the type of color temperature, for example, warm white, cool white, daylight color, neutral white, or the like may be adopted. As the type of illuminance, for example, dark, normal, bright, considerably bright, or the like may be adopted.

FIG. 4 shows an exemplary table which is stored and set in the microcomputer 12b. In the second preferred embodiment, as shown in FIG. 4, only if a fluorescent lamp is selected as the type of lighting, the type of color temperature can be selected. Specifically, in the second preferred embodiment, if a fluorescent lamp is selected as the type of lighting, target values T1 to T16 are determined in accordance with the combination of the type of lighting, the type of color temperature, and the type of illuminance. On the other hand, if any one other than the fluorescent lamp is selected as the type of lighting, target values T17 to T32 are determined in accordance with the combination of the type of lighting and the type of illuminance.

The microcomputer 12b automatically performs color calibration so that the colorimetry result obtained by the colorimeter 13 may agree with a target value.

The communication interface 12d is connected to the communication interface 11b on the side of the computer 11 through the communication means 16 in such a manner as to establish two-way communication.

The colorimeter 13 is disposed to face the image display unit 12a during the color calibration. The colorimeter 13 can perform colorimetry on the image displayed on the image display unit 12a from the outside.

Next, discussion will be made on an operation of the color calibration system 200 in accordance with the second preferred embodiment.

First, by using the keyboard 15 and the like, the user operates the computer 11 to start the color calibration. Then, the application software 11a installed in the computer 11 is started.

In accordance with the application software, the microcomputer 12b causes the display unit of the computer 11 (the display device 12 in the second preferred embodiment) to display a selection menu shown in FIG. 5.

On the display unit, as shown in FIG. 5, the type of lighting, the type of color temperature, and the type of illuminance are displayed in a selectable manner. Herein, in the second preferred embodiment, as discussed above, the type of color temperature is displayed in a selectable manner only if the fluorescent lamp is selected as the type of lighting.

When the above selection menu is displayed on the display unit, the user selects the type of lighting, the type of color temperature, and the type of illuminance by using the keyboard 15 and the like.

Next, in accordance with the combination of the type of lighting, the type of color temperature, and the type of illuminance which are selected from the section menu, the microcomputer 12b reads a predetermined one of the target values T1 to T32 corresponding to the combination out from the predetermined table.

Referring to FIG. 4, considered is a case, for example, where "fluorescent lamp" is selected as the type of lighting, "cool white" is selected as the type of color temperature, and "normal" is selected as the type of illuminance from the selection menu. In this case, the target value T8 is read out from the table shown in FIG. 4 which is stored in the microcomputer 12b.

Further, considered is a case where "incandescent lamp" is selected as the type of lighting and "dark" is selected as the type of illuminance from the selection menu. In this case, the target value T17 is read out from the table shown in FIG. 4 which is stored in the microcomputer 12b.

The colorimeter 13 performs colorimetry on the image displayed on the image display unit 12a as occasion arises while the microcomputer 12b reads a predetermined one of the target values T1 to T32 out from the table shown in FIG. 4. The colorimetry result is transferred through the communication interface 11b, the communication means 16, and the communication interface 12d to the microcomputer 12b on the side of the display device 12 as occasion arises.

In accordance with the application software 11a installed in the computer 11, the microcomputer 12b automatically performs the color calibration so that the received colorimetry result obtained by the colorimeter 13 may agree with the predetermined target value which is read out.

Thus, in the second preferred embodiment, the table shown in FIG. 4 is stored in the microcomputer 12b and one target value is determined through selection made on the selection menu shown in FIG. 5. It is therefore possible for a user having no expert knowledge to perform the color calibration precisely and simply without any special equipment.

<The Third Preferred Embodiment>

Figure 6:
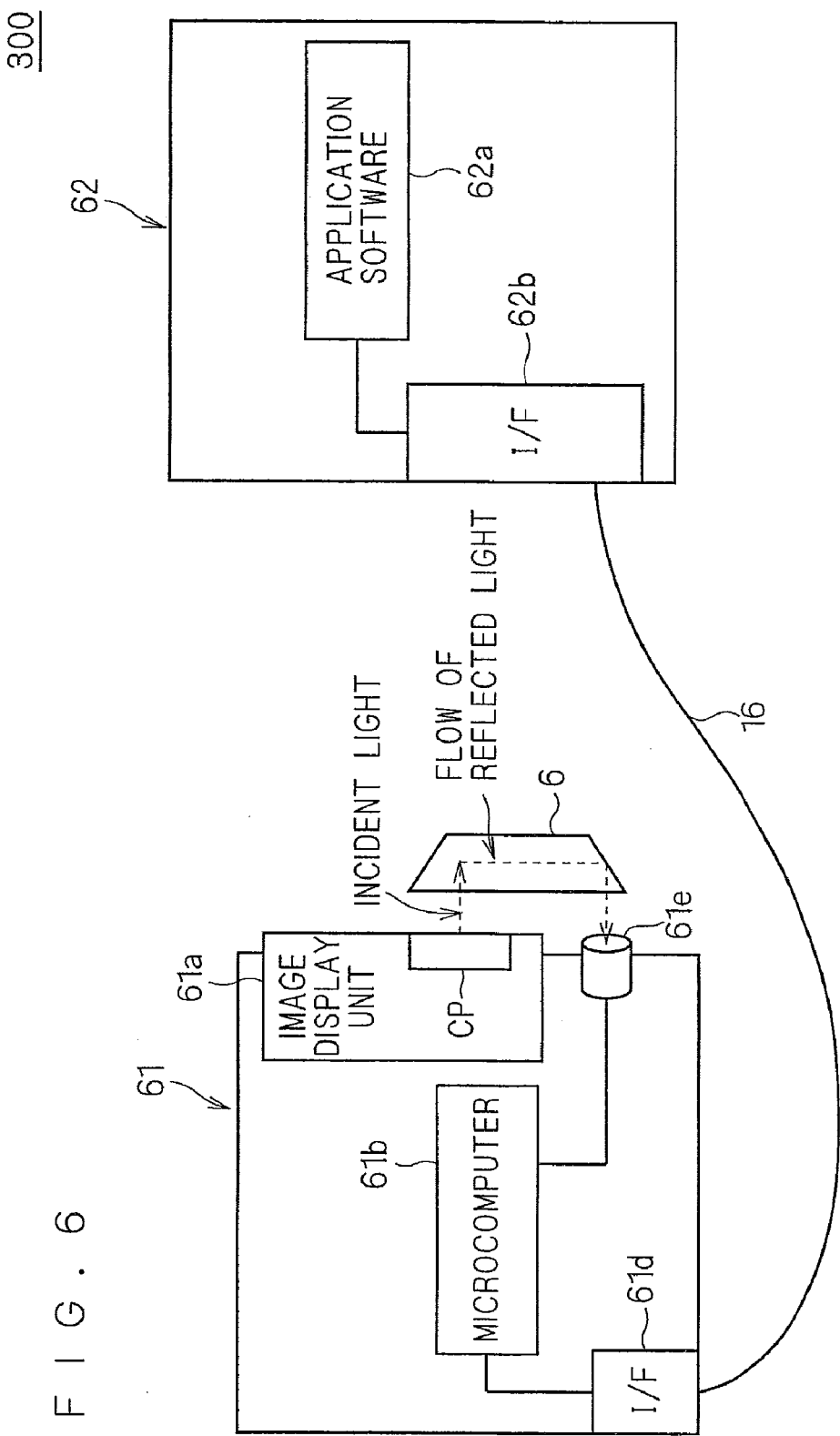
FIGS. 6 and 7 are views each showing a configuration of a color calibration system in accordance with a third preferred embodiment.
Figure 7:
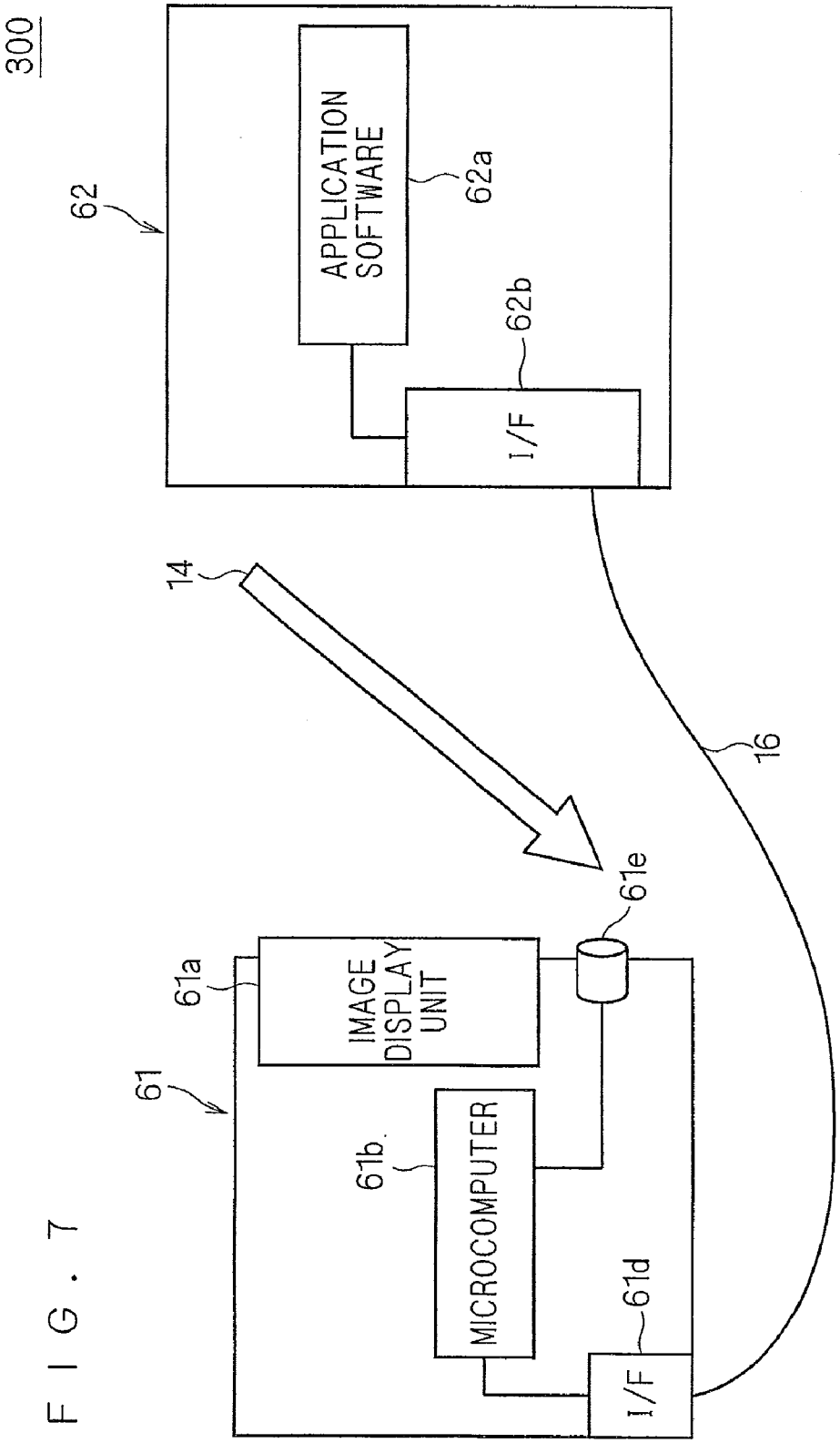

FIGS. 6 and 7 show a configuration of a color calibration system 300 for a display device for the purpose of color matching in accordance with the third preferred embodiment.

FIG. 6 shows a configuration in which a prism (or a reflecting mirror) 6 is attached to a display device 61. On the other hand, FIG. 7 shows a configuration in which the prism (or the reflecting mirror) 6 is detached from the display device 61.

As shown in FIGS. 6 and 7, the color calibration system 300 comprises a computer 62, the display device 61, the prism (or the reflecting mirror) 6, and the communication means 16.

Hereinafter, the prism 6 or reflecting mirror 6 is referred to as a "prism 6 or the like".

In the third preferred embodiment, as shown in FIG. 7, a result of measurement performed by an RUB color sensor 61e directly on the ambient light 14, not through the prism 6 or the like, is referred to as a "detection result". On the other hand, as shown in FIG. 6, a result of measurement performed by the RGB color sensor 61e indirectly on light emitted from an image display unit 6a through the prism 6 or the like, is referred to as a "colorimetry result".

Application software 62a for performing color calibration and making a color profile is installed in the computer 62. The computer 62 comprises a communication interface 62b.

The communication interface 62b is connected to a communication interface 61d on the side of the display device 61 in such a manner as to establish two-way communication.

Though not shown in FIG. 6 or 7, to the computer 62, a keyboard (including a mouse) is connected for operating the computer 62.

The display device 61 comprises an image display unit 61a, a microcomputer 61b, the interface 61d, and the RGB color sensor (RGB color filter sensor) 61e. The display device 61 can perform a white point adjustment through adjustment of emission balance of RGB primary colors to be subjected to color management.

As shown in FIGS. 6 and 7, the prism 6 or the like is attachable to and detachable from the display device 61. In a state of attachment, the prism 6 or the like receives light from the image display unit 61a and outputs the received light to the RGB color sensor 61e. In a state where the prism 6 or the like is attached to the display device 61, the prism 6 or the like blocks out the ambient light 14 so that the ambient light 14 cannot enter the RGB color sensor 61e. In other words, in the state where the prism 6 or the like is attached to the display device 61, only the light of an image displayed on the image display unit 61a, going through the prism 6 or the like and being outputted from the prism 6 or the like, is inputted to the RGB color sensor 61e.

On the image display unit 61a, displayed is a display image (including white, color patch CP, and the like). The image display unit 61a can also serve as a display unit of the computer 62 during the color calibration.

The RGB color sensor 61e is disposed near the image display unit 61a in the display device 61. The RGB color sensor 61e can detect a color temperature and illuminance of indeterminate ambient light 14 including lighting. Further, the RGB color sensor 61e can perform indirect colorimetry on a color temperature and illuminance of light of the image displayed on the image display unit 61a.

Specifically, in a state where the prism 6 or the like is not attached to the display device 61, the RUB color sensor 61e detects the ambient light 14 (a result of this detection corresponds to the above "detection result"). In the state where the prism 6 or the like is attached to the display device 61, the RGB color sensor file performs colorimetry on the display image on the image display unit 61a, which is inputted through the prism 6 or the like (a result of this colorimetry corresponds to the above "colorimetry result"). The RGB color sensor 61e outputs the measurement result obtained by itself as an RGB value.

In accordance with the application software 62a installed in the computer 62, the microcomputer 61b calculates a target value. The target value is calculated by using a first calculation equation preset in the microcomputer 61b and the detection result obtained by the RGB color sensor 61e provided in the display device 61. The detection result refers to a detection result obtained by the RGB color sensor 61e on the ambient light 14 in the state where the prism 6 or the like is not attached to the display device 61.

In the microcomputer 61b, besides the first calculation equation, a second calculation equation is also set. Herein, the second calculation equation refers to an equation for converting the RGB value which is the colorimetry result obtained by the RGB color sensor 61e into an XYZ tristimulus value.

In accordance with the application software 62a installed in the computer 62, the microcomputer 61b further automatically performs color calibration by using the colorimetry result obtained by the RGB color sensor 61e and the target value. Specifically, the microcomputer 61b converts the colorimetry result obtained by the RGB color sensor 61e into the XYZ tristimulus value by using the second calculation equation. Then, the microcomputer 61b automatically performs the color calibration so that the converted XYZ tristimulus value may agree with the target value.

The communication interface 61d is connected to the communication interface 62b on the side of the computer 62 through the communication means 16 in such a manner as to establish two-way communication.

Next, discussion will be made on an operation of the color calibration system 300 in accordance with the third preferred embodiment.

First, as shown in FIG. 7, the state in which the prism 6 or the like is not attached to the display device 61 is created. By using the keyboard and the like, the user performs an operation for causing the color calibration system 300 to recognize that the prism 6 or the like is not attached. There may be a case where a sensor (not shown) is additionally provided in the display device 61 and the sensor automatically detects whether the prism 6 or the like is attached or not.

Next, in accordance with the application software 62a installed in the computer 62, the microcomputer 61b controls the RGB color sensor 61e. Under the control, the RGB color sensor 61e provided in the display device 61 detects the color temperature and the illuminance of the ambient light 14 including lighting. Herein, as shown in FIG. 7, the ambient light 14 is detected directly, not through the prism 6 or the like. The RGB color sensor 61e outputs the detection result as an RGB value signal and transfers the detection result to the microcomputer 61b.

In accordance with the application software 62a installed in the computer 62, the microcomputer 61b calculates the target value. The target value is calculated in the state where the microcomputer 61b recognizes that the prism 6 or the like is not attached. The target value is calculated by using the first calculation equation (Eq. 11) preset in the microcomputer 61b and the received detection result (the detection result transferred from the RGB color sensor 61e). The first calculation equation (Eq. 11) is expressed as:

$$\begin{pmatrix} X \\ Y \\ Z \end{pmatrix} = \begin{pmatrix} K_{xr} & K_{xg} & K_{xb} \\ K_{yr} & K_{yg} & K_{yb} \\ K_{zr} & K_{zg} & K_{zb} \end{pmatrix} \times \begin{pmatrix} R \\ G \\ B \end{pmatrix} \quad \text{(Eq. 11)}$$

Herein, the left side of Eq. 11 represents the above target value calculated by the microcomputer 61b. The target value is calculated as an XYZ tristimulus value matrix. The first term of the right side of Eq. 11 represents a first matrix correction factor matrix. The second term of the right side of Eq. 11 represents an RGB value matrix which is the above detection result transferred from the RGB color sensor 61e.

The first matrix correction factor matrix is set in the microcomputer 61b in advance. The first matrix correction factor matrix is calculated by using a measurement result obtained by the RGB color sensor 61e on a predetermined color temperature sample and an XYZ measurement result obtained by the reference colorimeter (not shown) on the predetermined color temperature sample before performing the color calibration. The reference colorimeter can measure tristimulus values XYZ. A method of calculating the first matrix correction factor matrix will be specifically discussed below.

First, as the color temperature samples (fluorescent lamp samples having different color temperatures), prepared are samples 1, 2, and 3. The samples 1, 2, and 3 are measured directly by the RGB color sensor 61e (in other words, not through the prism 6 or the like). On the other hand, the samples 1, 2, and 3 are measured directly by the reference colorimeter. The measurement result (RGB values) obtained by the RGB color sensor 61e and the measurement result (XYZ tristimulus values) obtained by the reference colorimeter are shown in FIG. 2.

In the exemplary case of FIG. 2, the measurement result obtained by the RGB color sensor 61e on the sample 1 indicates "R1, G1, B1". The measurement result obtained by the RGB color sensor 61e on the sample 2 indicates "R2, G2, B2". The measurement result obtained by the RGB color sensor 61e on the sample 3 indicates "R3, G3, B3". On the other hand, the measurement result obtained by the reference colorimeter on the sample 1 indicates "X1, Y1, Z1". The measurement result obtained by the reference colorimeter on the sample 2 indicates "X2, Y2, Z2". The measurement result obtained by the reference colorimeter on the sample 3 indicates "X3, Y3, Z3".

Next, matrix elements of the first matrix correction factor matrix are obtained by using Eqs. 12, 13, and 14 shown below and the measurement results shown in FIG. 2.

$$\begin{pmatrix} K_{xr} \\ K_{xg} \\ K_{xb} \end{pmatrix} = \begin{pmatrix} R1 & G1 & B1 \\ R2 & G2 & B2 \\ R3 & G3 & B3 \end{pmatrix}^{-1} \times \begin{pmatrix} X1 \\ X2 \\ X3 \end{pmatrix} \quad \text{(Eq. 12)}$$

$$\begin{pmatrix} K_{yr} \\ K_{yg} \\ K_{yb} \end{pmatrix} = \begin{pmatrix} R1 & G1 & B1 \\ R2 & G2 & B2 \\ R3 & G3 & B3 \end{pmatrix}^{-1} \times \begin{pmatrix} Y1 \\ Y2 \\ Y3 \end{pmatrix} \quad \text{(Eq. 13)}$$

$$\begin{pmatrix} K_{zr} \\ K_{zg} \\ K_{zb} \end{pmatrix} = \begin{pmatrix} R1 & G1 & B1 \\ R2 & G2 & B2 \\ R3 & G3 & B3 \end{pmatrix}^{-1} \times \begin{pmatrix} Z1 \\ Z2 \\ Z3 \end{pmatrix} \quad \text{(Eq. 14)}$$

The calculated first matrix correction factor matrix is set in the microcomputer 61b before performing the color calibration.

Returning to discussion on the operation of the third preferred embodiment, the microcomputer 61b calculates the target value from Eq. 11 by using the preset first matrix correction factor and the above detection result transferred from the RGB color sensor 61e.

Next, as shown in FIG. 6, the prism 6 or the like is attached to the display device 61. By using the keyboard and the like, the user performs an operation for causing the color calibration system 300 to recognize that the prism 6 or the like is attached. As discussed above, there may be a case where a sensor (not shown) is additionally provided in the display device 61 and the sensor automatically detects whether the prism 6 or the like is attached or not.

Next, in accordance with the application software 62a installed in the computer 62, the microcomputer 61b controls the RGB color sensor 61e. Under the control, the RGB color sensor 61e recognizes that the prism 6 or the like is attached to the display device 61 and then performs colorimetry on the image displayed on the image display unit 61a as occasion arises. As shown in FIG. 6, the light of the image displayed on the image display device 61 enters the prism 6 or the like. Then, the incident light is reflected inside the prism 6 or the like. The reflected light is outputted from the prism 6 or the like and inputted to the RGB color sensor 61e.

The colorimetry result (RGB values) obtained by the RGB color sensor 61e is transferred to the microcomputer 61b.

In accordance with the application software 62a installed in the computer 62, the microcomputer 61b converts the colorimetry result into the XYZ tristimulus value by using the preset second calculation equation (Eq. 15). The second calculation equation (Eq. 15) is expressed as:

$$\begin{pmatrix} X' \\ Y' \\ Z' \end{pmatrix} = \begin{pmatrix} K'_{xr} & K'_{xg} & K'_{xb} \\ K'_{yr} & K'_{yg} & K'_{yb} \\ K'_{zr} & K'_{zg} & K'_{zb} \end{pmatrix} \times \begin{pmatrix} R' \\ G' \\ B' \end{pmatrix} \quad \text{(Eq. 15)}$$

Herein, the left side of Eq. 15 represents the converted XYZ tristimulus value matrix. The first term of the right side of Eq. 15 represents a second matrix correction factor matrix. The second term of the right side of Eq. 15 represents an RGB value matrix which is the colorimetry result obtained by the RGB color sensor 61e.

The second matrix correction factor matrix is set in the microcomputer 61b in advance. The second matrix correction factor matrix is calculated by using a measurement result indirectly obtained by the RUB color sensor 61e on the color patch CP displayed on the image display unit 61a and an XYZ measurement result directly obtained by the reference colorimeter (not shown) on the color patch CP before performing the color calibration. The reference colorimeter can measure tristimulus values XYZ. A method of calculating the second matrix correction factor matrix will be specifically discussed below.

First, the color patch CP including the samples 1, 2, and 3 is displayed on the image display unit 61a. The prism 6 or the like is attached to the display device 61. The samples 1 to 3 are measured indirectly by the RGB color sensor 61e (in other words, through the prism 6 or the like). On the other hand, the samples 1 to 3 are measured directly by the reference colorimeter (in other words, not through the prism 6 or the like). The measurement result (RGB values) obtained by the RGB color sensor 61e and the measurement result (XYZ tristimulus values) obtained by the reference colorimeter are shown in FIG. 8.

In the exemplary case of FIG. 8, the measurement result obtained by the RGB color sensor 61e on the sample 1 indicates "R1', G1', Br'". The measurement result obtained by the RUB color sensor 61e on the sample 2 indicates "R2', G2', B2'". The measurement result obtained by the RGB color sensor 61e on the sample 3 indicates "R3', G3', B3'". On the other hand, the measurement result obtained by the reference colorimeter on the sample 1 indicates "X1', Y1', Z1'". The measurement result obtained by the reference colorimeter on the sample 2 indicates "X2', Y2', Z2'". The measurement result obtained by the reference colorimeter on the sample 3 indicates "X3', Y3', Z3'".

Next, matrix elements of the second matrix correction factor matrix are obtained by using Eqs. 16, 17, and 18 shown below and the measurement results shown in FIG. 8.

$$\begin{pmatrix} K'_{xr} \\ K'_{xg} \\ K'_{xb} \end{pmatrix} = \begin{pmatrix} R1' & G1' & B1' \\ R2' & G2' & B2' \\ R3' & G3' & B3' \end{pmatrix}^{-1} \times \begin{pmatrix} X1' \\ X2' \\ X3' \end{pmatrix} \quad \text{(Eq. 16)}$$

$$\begin{pmatrix} K'_{yr} \\ K'_{yg} \\ K'_{yb} \end{pmatrix} = \begin{pmatrix} R1' & G1' & B1' \\ R2' & G2' & B2' \\ R3' & G3' & B3' \end{pmatrix}^{-1} \times \begin{pmatrix} Y1' \\ Y2' \\ Y3' \end{pmatrix} \quad \text{(Eq. 17)}$$

$$\begin{pmatrix} K'_{zr} \\ K'_{zg} \\ K'_{zb} \end{pmatrix} = \begin{pmatrix} R1' & G1' & B1' \\ R2' & G2' & B2' \\ R3' & G3' & B3' \end{pmatrix}^{-1} \times \begin{pmatrix} Z1' \\ Z2' \\ Z3' \end{pmatrix} \quad \text{(Eq. 18)}$$

The calculated second matrix correction factor matrix is set in the microcomputer 61b before performing the color calibration.

Returning to discussion on the operation of the third preferred embodiment, in accordance with the application software 62a installed in the computer 62, the microcomputer 61b automatically performs the color calibration so that the colorimetry result obtained by the RGB color sensor 61e, which is converted into the XYZ tristimulus value by using Eq. 15, may agree with the above target value which is already calculated.

Since the color calibration system of the third preferred embodiment has the above configuration, the system does not need any special measurement device. Further, by using the RGB color sensor 61e to detect the indeterminate ambient light 14, it is possible for a user having no expert knowledge to easily determine the type of ambient light 14 and the color temperature thereof. The target value is calculated from the above detection result and an automatic adjustment of the white point and luminance is performed so that the target value may agree with the colorimetry result obtained by the RGB color sensor 61e. It is therefore possible to perform the color calibration precisely and simply. Further, by attaching the attachable and detachable prism 6 or the like to the display device 61, the colorimeter 13 of the first preferred embodiment can be omitted.

In the above discussion, the microcomputer 61b performs calculation of the target value, conversion of the colorimetry result obtained by the RGB color sensor 61e into the XYZ tristimulus value, the color calibration, and so on. There may be a case, however, where the calculation of the target value is performed on the side of the computer 62 and the microcomputer 61b performs the conversion of the colorimetry result obtained by the RGB color sensor 61e into the XYZ tristimulus value, and the color calibration.

Though the XYZ tristimulus value is obtained as the target value in the above discussion, a CIE chromaticity xy value may be adopted as the target value.

<The Fourth Preferred Embodiment>

The color calibration discussed in the first to third preferred embodiments needs to be performed in a state where the luminance and the color temperature of the display device 12 or 61 are stable. In the fourth preferred embodiment, provided is a color calibration system capable of performing the color calibration in the state where the luminance and the color temperature of the display device 12 or 61 are stable.

In a color calibration system of the fourth preferred embodiment, the display device is additionally provided with two temperature sensors Ts1 and Ts2 besides the configuration of the display device 12 or 61 in accordance with the first to third preferred embodiments.

A control unit determines whether or not to perform the color calibration on the basis of respective measurement results of the temperature sensors Ts1 and Ts2. In the fourth preferred embodiment, the display device is also provided with the control unit. In the fourth preferred embodiment, however, the microcomputer 12b or 61b in the first to third preferred embodiments serves also as the control unit.

Figure 9:
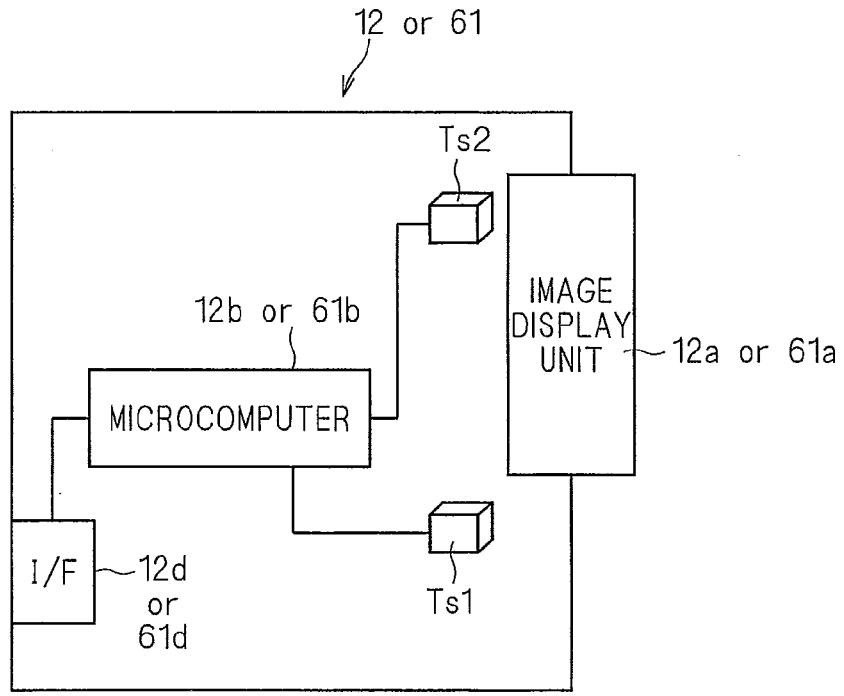
FIGS. 9 and 10 are views each showing a configuration of a color calibration system (particularly, a display device) in accordance with a fourth preferred embodiment.

FIG. 9 shows a configuration in which the two temperature sensors Ts1 and Ts2 are provided in the display device 12 or 61. In the fourth preferred embodiment, one of the temperature sensors, Ts1, is disposed at a first location in the display device 12 or 61. On the other hand, the other temperature sensor Ts2 is disposed at a second location in the display device 12 or 61. Herein, during the operation of the display device 12 or 61, at the second location, the temperature is higher than that at the first location.

The color calibration needs to be performed in the state where the luminance and the color temperature of the display device 12 or 61 are stable. Therefore, it is preferable that the difference in temperature between the first location and the second location is larger during the operation of the display device 12 or 61.

Figure 10:
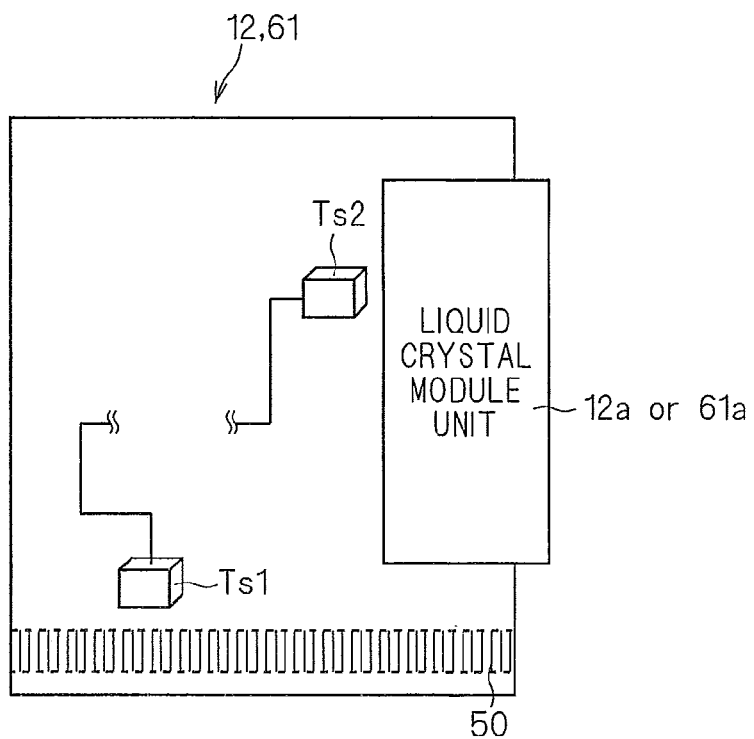

In FIG. 10, the image display unit 12a or 61a in the display device 12 or 61 is a liquid crystal module unit. Further, in FIG. 10, the display device 12 or 61 is provided with a ventilation unit 50 through which air is taken from the outside of the display device to the inside thereof. As shown in FIG. 10, the first location at which the one temperature sensor Ts1 is provided is a location near the ventilation unit 50 in the display device 12 or 60 where the temperature is lowest in the display device 12 or 61 during operation. The second location at which the temperature sensor Ts2 is provided is a location at a center portion of the liquid crystal module unit 12a or 61a in a plan view of the display device 12 or 61 where the temperature is highest in the display device 12 or 61 during operation.

Next, discussion will be made on an operation of the fourth preferred embodiment.

The microcomputer 12b or 61b serving as the control unit acquires respective detection results of the temperature sensors Ts1 and Ts2 at certain time intervals (e.g., at intervals of 5 seconds).

The microcomputer 12b or 61b receives a command to start the color calibration from the side of the computer 11 or 62. After receiving the command, the microcomputer 12b or 61b calculates the difference between a sensed temperature acquired from the one temperature sensor Ts1 and a sensed temperature acquired from the other temperature sensor Ts2. The difference between these sensed temperatures is calculated, naturally, by using the respective sensed temperatures that the microcomputer 12b or 61b receives from the temperature sensors Ts1 and Ts2 at the same time.

Herein, immediately after receiving the above command (at time t1), the microcomputer 12b or 61b receives a sensed temperature T1 from the one temperature sensor Ts1 and receives a sensed temperature T2 from the other temperature sensor Ts2.

Then, the microcomputer 12b or 61b calculates the difference (T2−T1) between the sensed temperature T2 and the sensed temperature T1.

As discussed above, the microcomputer 12b or 61b acquires the respective sensed temperatures from the temperature sensors Ts1 and Ts2 at certain time intervals (e.g., at intervals of 5 seconds) as occasion arises. At time t2 after e.g., 5 seconds elapsed from time t1, the microcomputer 12b or 61b receives a sensed temperature T11 from the one temperature sensor Ts1 and receives a sensed temperature T12 from the other temperature sensor Ts2. Substantially, the microcomputer 12b or 61b calculates the difference (T12−T11) between the sensed temperature T12 and the sensed temperature T11.

Next, the microcomputer 12b or 61b determines whether or not to perform the color calibration on the basis of the time variation of the differential value between the detection result of the one temperature sensor Ts1 and that of the other temperature sensor Ts2 and a threshold value. The threshold value is set in the microcomputer 12b or 61b in advance.

Specifically, the microcomputer 12b or 61b calculates an absolute value of the difference between the sensed temperature difference of this time and that of the last time. In the above case, the microcomputer 12b or 61b calculates |(T12−T11)−(T2−T1)|(=time variation). Then, the microcomputer 12b or 61b judges if the calculated result (time variation) is larger than the threshold value. In other expression using a numerical formula, the microcomputer 12b or 61b judges if |(T12−T11)−(T2−T1)|>the threshold value. In other words, the microcomputer 12b or 61b determines whether the display device 12 or 61 is in a warm-up state or in a stable state after the warm-up state.

If the time variation is larger than the threshold value (the time variation>the threshold value, and in other words, in a case where the time variation in temperature between the first and second locations is large), the microcomputer 12b or 61b determines not to perform the color calibration.

On the other hand, if the time variation is not larger than the threshold value (the time variation≦the threshold value, and in other words, in a case where the time variation in temperature between the first and second locations is relatively small), the microcomputer 12b or 61b determines to perform the color calibration.

Next, discussion will be made on an operation after the microcomputer 12b or 61b determines not to perform the color calibration as discussed above.

When the microcomputer 12b or 61b determines not to perform the color calibration, the microcomputer 12b or 61b transfers the determination to the computer 11 or 62 through the communication means 16.

Then, in accordance with the application software 11a or 62a, the computer 11 or 62 displays the following message on the display unit of the computer 11 or 62 (e.g., the display unit shared with the display device 12 or 61). In other words, since the display device 12 or 61 is in the warm-up state, where it is inappropriate to perform the color calibration, the computer 11 or 62 does not perform the color calibration at the present time and displays the message indicating that the system is in a stand-by state on the display unit. It can be thought that the display unit serves as a notification means for notifying the outside of the result of determination not to perform the color calibration.

On the other hand, also after the above determination not to perform the color calibration, the microcomputer 12b or 61b sequentially acquires the respective sensed temperatures of the temperature sensors Ts1 and Ts2 at certain time intervals (e.g., at intervals of 5 seconds).

The microcomputer 12b or 61b continues to calculate the absolute value of the difference between the sensed temperature difference of the latest time between the temperature sensors Ts1 and Ts2 and that of the immediately previous time between the temperature sensors Ts1 and Ts2 until the time variation becomes not larger than the threshold value (the time variation≦the threshold value and the stable state of the display device 12 or 61).

It is assumed that the microcomputer 12b or 61b detects that the time variation is not larger than the threshold value (the time variation≦the threshold value) after a certain time period elapsed. Since the detection of that means that the display device 12 or 61 is in the stable state after completion of warm-up, the microcomputer 12b or 61b automatically performs the color calibration after the detection (in other words, the microcomputer performs the color calibration discussed in the first to third preferred embodiments).

Thus, in the color calibration system of the fourth preferred embodiment, the microcomputer 12b or 61b serving as the control unit determines whether or not to perform the color calibration on the basis of the time variation of the differential value between the detection result of the one temperature sensor Ts1 and that of the other temperature sensor Ts2 and the threshold value.

Therefore, in the color calibration system of the fourth preferred embodiment, it is possible to detect whether the display device 12 or 61 is in the warm-up state or the stable state, and the color calibration for the display device 12 or 61 can be always performed in the stable state of the display device 12 or 61.

Further, in the fourth preferred embodiment, as shown in FIG. 10, the one temperature sensor Ts1 is disposed near the ventilation unit 50 where the temperature increases least in the display device 12 or 61 during operation. The other temperature sensor Ts2 is disposed at the center portion of the liquid crystal module unit 12a or 61a where the temperature increases most in the display device 12 or 61 during operation.

Therefore, it is possible to judge whether the display device 12 or 61 is in the warm-up state or the stable state with high accuracy. In other words, the precision of the color calibration increases.

As an application example of the present invention, the present invention can be applied to computer equipments including displays for home use. Further, the present invention can be used for adjustment of displays for some industries in determination of adjustment target point in a color adjustment apparatus using a colorimeter or the like, and so on.

While the invention has been shown and described in detail, the foregoing description is in all aspects illustrative and not restrictive. It is therefore understood that numerous modifications and variations can be devised without departing from the scope of the invention.

What is claimed is:

1. A color calibration system, comprising:
   a display device provided with a color sensor for detecting a color temperature and illuminance of ambient light;
   a microcomputer;
   a colorimeter for performing colorimetry on a display screen of said display device from outside the display device:
   a control unit:
   a first temperature sensor provided at a first location of said display device: and
   a second temperature sensor provided at a second location where the temperature is higher than that of said first location during operation,
   wherein said microcomputer calculates a target value by using a preset calculation equation and a detection result on said ambient light detected by said color sensor, and
   said control unit determines whether or not to automatically perform color calibration of said display device so that a colorimetry result obtained by said colorimeter agrees with said target value on the basis of a time variation of a differential value between a detection result obtained by said first sensor and a detection result obtained by said second temperature sensor and a preset threshold value.

2. The color calibration system according to claim 1, wherein
   said color sensor is an RGB color sensor for outputting a measurement result as an RGB value,
   said calculation equation is expressed as $$\begin{pmatrix} X \\ Y \\ Z \end{pmatrix} = \begin{pmatrix} K_{xr} & K_{xg} & K_{xb} \\ K_{yr} & K_{yg} & K_{yb} \\ K_{zr} & K_{zg} & K_{zb} \end{pmatrix} \times \begin{pmatrix} R \\ G \\ B \end{pmatrix}$$

where the left side of said calculation equation is an XYZ tristimulus value matrix which is said target value,
the first term of the right side of said calculation equation is a matrix correction factor matrix, and
the second term of the right side of said calculation equation is an ROB value matrix which is said result of detection.

3. The color calibration system according to claim 2, wherein
   calculation of said matrix correction, factor matrix is performed before performing said color calibration by using an RGB measurement result obtained by said color sensor on a predetermined color temperature sample and an XYZ measurement result obtained by a reference colorimeter on said predetermined color temperature sample, and
   said matrix correction factor matrix after said calculation is set in said microcomputer.

4. The color calibration system according to claim 1, wherein said display device comprises
   a ventilation unit through which air is taken from the outside to the inside of the display device; and
   a liquid crystal unit for displaying an image,
   said first location is near said ventilation unit, and
   said second location is at a center portion of said liquid crystal unit in the inside of said display device.

5. The color calibration system according to claim 1, wherein said control unit determines not to perform said color calibration if said time variation is larger than said threshold value.

6. The color calibration system according to claim 5, further comprising a notification means for providing notification of the result of the determination when said control unit determines not to perform said color calibration.

7. The color calibration system according to claim 6, wherein after said control unit determines not to perform said color calibration, when said control unit detects that said time variation is not larger than said threshold value, said microcomputer performs said color calibration after said detection.

8. The color calibration system according to claim 1, wherein said control unit determines to perform said color calibration when said time variation is not larger than said threshold value.

9. A color calibration system, comprising:
a display device;
a microcomputer;
a colorimeter for performing colorimetry on a display screen of said display device from outside the display device;
a control unit;
a first temperature sensor provided at a first location of said display device; and
a second temperature sensor provided at a second location where the temperature is higher than that of said first location during operation,
wherein said microcomputer comprises a storage unit for storing target values corresponding to a combination of the type of lighting and the type of illuminance therein,
displays said type of lighting and said type of illuminance as a selection menu in a selectable manner on a predetermined display unit,
reads a predetermined said target value out from said storage unit in accordance with a combination of said type of lighting and said type of illuminance which is selected from said selection menu, and
said control unit determines whether or not to automatically perform color calibration so that said predetermined target value which is read out agrees with a colorimetry result obtained by said colorimeter on the basis of a time variation of a differential value between a detection result obtained by said first sensor and a detection result obtained by said second temperature sensor and a preset threshold value.

10. The color calibration system according to claim 9, wherein said display device comprises
a ventilation unit through which air is taken from the outside to the inside of the display device; and
a liquid crystal unit for displaying an image,
said first location is near said ventilation unit, and
said second location is at a center portion of said liquid crystal unit in the inside of said display device.

11. The color calibration system according to claim 9, wherein said control unit determines not to perform said color calibration if said time variation is larger than said threshold value.

12. The color calibration system according to claim 11, further comprising a notification means for providing notification of the result of the determination when said control unit determines not to perform said color calibration.

13. The color calibration system according to claim 12 wherein after said control unit determines not to perform said color calibration, when said control unit detects that said time variation is not larger than said threshold value, said microcomputer performs said color calibration after said detection.

14. The color calibration system according to claim 9, wherein said control unit determines to perform said color calibration when said time variation is not larger than said threshold value.

15. A color calibration system, comprising:
a display device provided with a color sensor for detecting a color temperature and illuminance;
a microcomputer;
a prism or a reflecting mirror attachable to and detachable from said display device; and
a control unit;
a first temperature sensor provided at a first location of said display device; and
a second temperature sensor provided at a second location where the temperature is higher than that of said first location during operation,
wherein said microcomputer calculates a target value by using a detection result on ambient light detected by said color sensor in a state where said prism or said reflecting mirror is not attached and a first calculation equation which is preset,
said color sensor performs colorimetry on a display screen of said display device, which is inputted through said prism or said reflecting mirror in a state where said prism or said reflecting mirror is attached, and
said control unit determines whether or not to automatically perform color calibration by using the result of said colorimetry obtained by said color sensor and said target value on the basis of a time variation of a differential value between a detection result obtained by said first sensor and a detection result obtained by said second temperature sensor and a preset threshold value.

16. The color calibration system according to claim 15, wherein
said color sensor is an RGB color sensor for outputting a measurement result as an RGB value,
said microcomputer has a second calculation equation for converting an RGB value which is a result of colorimetry obtained by said color sensor into an XYZ tristimulus value,
converts said result of colorimetry obtained by said color sensor into said XYZ tristimulus value by using said second calculation equation, and
automatically performs color calibration so that said XYZ tristimulus value after conversion agrees with said target value,
said first calculation equation is expressed as $$\begin{pmatrix} X \\ Y \\ Z \end{pmatrix} = \begin{pmatrix} K_{xr} & K_{xg} & K_{xb} \\ K_{yr} & K_{yg} & K_{yb} \\ K_{zr} & K_{zg} & K_{zb} \end{pmatrix} \times \begin{pmatrix} R \\ G \\ B \end{pmatrix}$$

and said second calculation equation is expressed as $$\begin{pmatrix} X' \\ Y' \\ Z' \end{pmatrix} = \begin{pmatrix} K'_{xr} & K'_{xg} & K'_{xb} \\ K'_{yr} & K'_{yg} & K'_{yb} \\ K'_{zr} & K'_{zg} & K'_{zb} \end{pmatrix} \times \begin{pmatrix} R' \\ G' \\ B' \end{pmatrix}$$

where the left side of said first calculation equation is an XYZ tristimulus value matrix which is said target value,
the first term of the right side of said first calculation equation is a first matrix correction factor matrix, and
the second term of the right side of said first calculation equation is an RGB value matrix which is said detection result, the left side of said second calculation equation is an XYZ tristimulus value matrix after conversion, the first term of the right side of said second calculation equation is a second matrix correction factor matrix, and the second term of the right side of said second calculation equation is an RGB value matrix which is said result of colorimetry.

17. The color calibration system according to claim 16, wherein calculation of said first matrix correction factor matrix is performed by using an RGB measurement result obtained by said color sensor on a color temperature sample and an XYZ measurement result obtained by a reference colorimeter on said color temperature sample before performing said color calibration, calculation of said second matrix correction factor matrix is performed by using an RGB measurement result obtained by said color sensor on light of a color patch displayed on said display device, which is obtained through said prism or said reflecting mirror, and an XYZ measurement result obtained by a reference colorimeter of said color patch displayed on said display device before performing said color calibration, and said first matrix correction factor matrix after said calculation and said second matrix correction factor matrix after said calculation are set in said microcomputer.

18. The color calibration system according to claim 15, wherein said display device comprises a ventilation unit through which air is taken from the outside to the inside of the display device; and a liquid crystal unit for displaying an image, said first location is near said ventilation unit, and said second location is at a center portion of said liquid crystal unit in the inside of said display device.

19. The color calibration system according to claim 15, wherein said control unit determines not to perform said color calibration if said time variation is larger than said threshold value.

20. The color calibration system according to claim 19, further comprising a notification means for providing notification of the result of the determination when said control unit determines not to perform said color calibration.

21. The color calibration system according to claim 20, wherein after said control unit determines not to perform said color calibration, when said control unit detects that said time variation is not larger than said threshold value, said microcomputer performs said color calibration after said detection.

22. The color calibration system according to claim 15, wherein said control unit determines to perform said color calibration when said time variation is not larger than said threshold value.

* * * * *